United States Patent [19]
Williams

[11] 3,922,551
[45] Nov. 25, 1975

[54] DETECTION OF $CO_2$ IN A HYPERBARIC GASEOUS ENVIRONMENT

[75] Inventor: Kevin G. Williams, Pinole, Calif.

[73] Assignee: The United States of America as represented by the Secretary of the Navy, Washington, D.C.

[22] Filed: Sept. 27, 1974

[21] Appl. No.: 509,872

[52] U.S. Cl. .................. 250/343; 250/340; 356/51
[51] Int. Cl.² ........................................ G01M 21/26
[58] Field of Search .......... 250/343, 340, 344, 345, 250/338; 356/51

[56] References Cited
UNITED STATES PATENTS

| | | | |
|---|---|---|---|
| 2,939,953 | 6/1960 | Parsons et al. | 250/343 |
| 3,005,097 | 10/1961 | Hummel | 250/343 |
| 3,679,899 | 4/1972 | Dimeff | 250/343 |
| 3,728,540 | 4/1973 | Todd et al. | 250/343 |
| 3,827,675 | 8/1974 | Schuman | 250/343 |

*Primary Examiner*—Archie R. Borchelt
*Assistant Examiner*—B. C. Anderson
*Attorney, Agent, or Firm*—R. S. Sciascia; P. Schneider; W. J. Sheehan

[57] ABSTRACT

An infrared source emits radiaiton which is transmitted through a chamber containing a mixed sample of gas. The gas is subjected to density modulation by a piston which compresses and expands the gas in the chamber in a precisely controlled manner. An infrared detector measures the amount of radiation passing through the gas so that the gas concentration is determined by the fractional change in radiation at the detector. The invention also includes a specific radiation detector for detecting the radiation and monitoring the total light flux reaching the detector.

5 Claims, 3 Drawing Figures

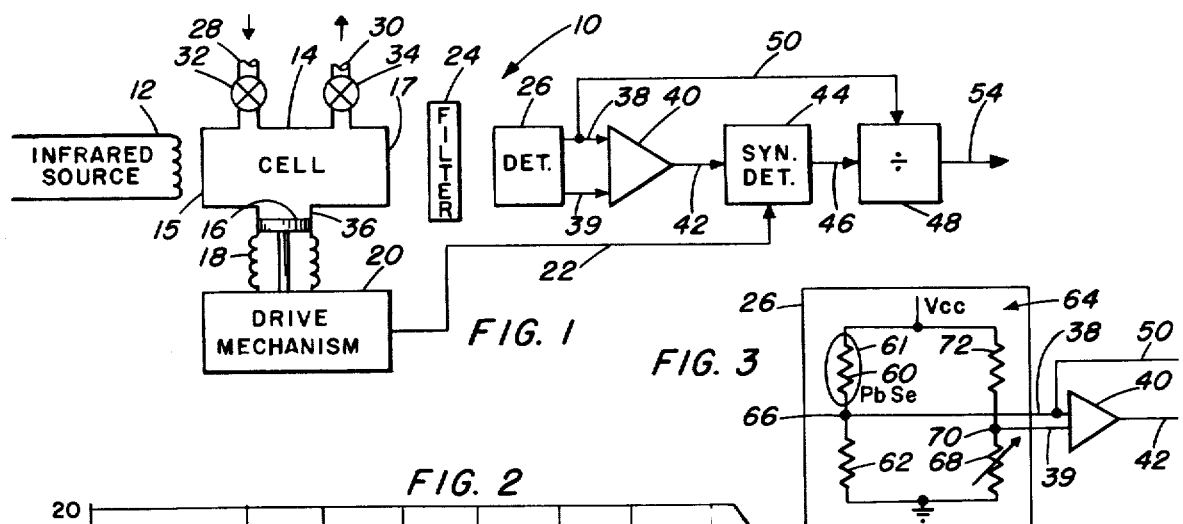
FIG. 1
FIG. 3
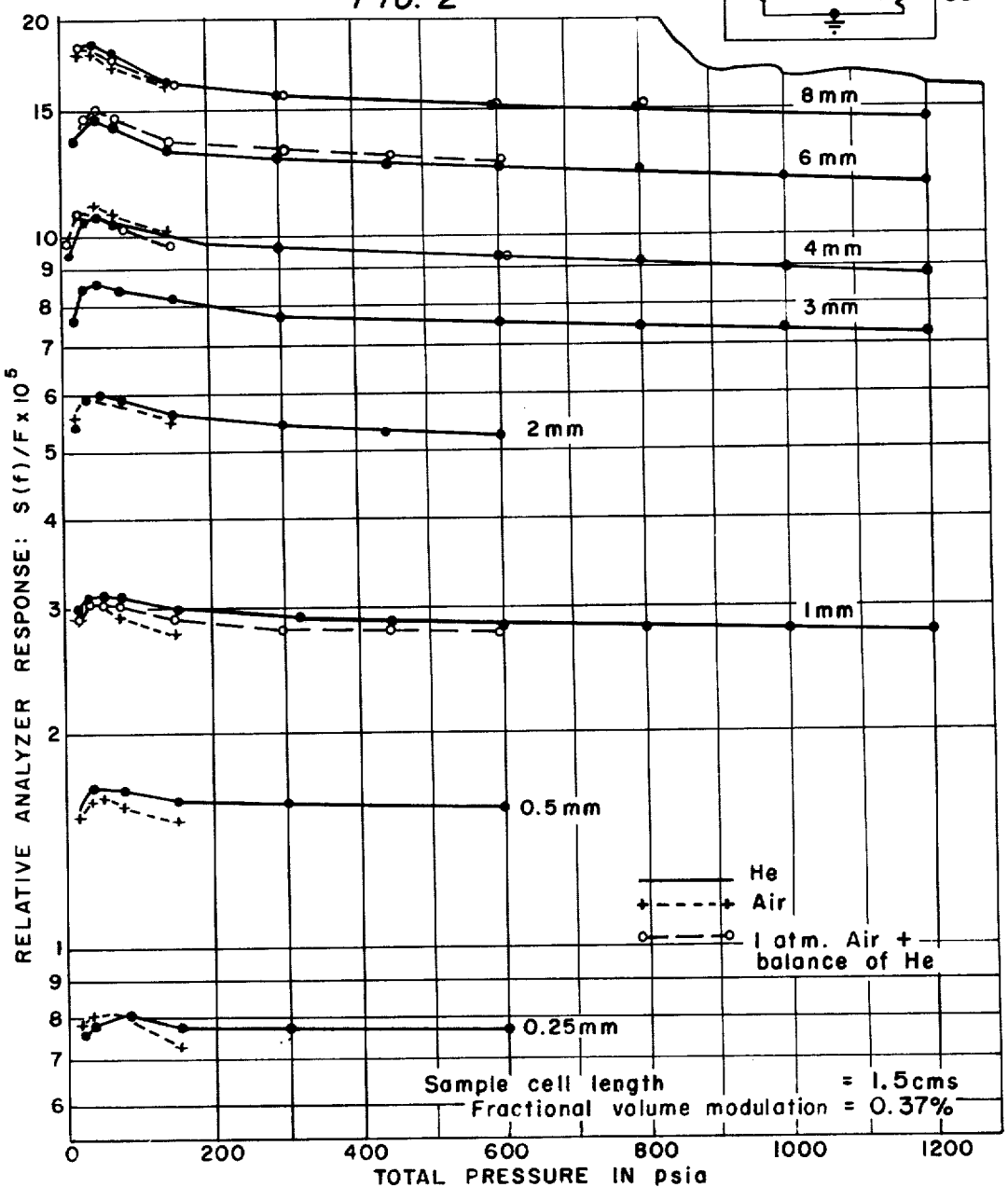
FIG. 2

DETECTION OF CO₂ IN A HYPERBARIC GASEOUS ENVIRONMENT

BACKGROUND OF THE INVENTION

1. Field of the Invention

The present invention relates, in general, to the detection of trace quantities of gases and, more particularly to the detection of $CO_2$ by a sensor of minature size which can be placed in a saturation diver's breathing apparatus.

2. Description of the Prior Art

With increasing emphasis on safety, a need has developed for a small, accurate and reliable $CO_2$ sensor which can be inserted into a saturation diver's breathing apparatus to provide a fast response in the event of buildup of $CO_2$. Harmful, and sometimes even fatal physiological effects occur if continuous exposure of $CO_2$ is above a partial pressure ($pCO_2$) of approximately 4mm at a predetermined total pressure, although higher levels can be tolerated for short periods of time. A continuous monitor of $PCO_2$ would be of great assistance in preventing dangerous prolonged exposure of a diver to $CO_2$. Ideally, the monitor would signify any failure of a canister containing $CO_2$ absorbing material which is generally incorporated in a divers breathing apparatus. Such failures can occur even if canisters are designed for eight hours of operation, since they may malfunction after only 15 minutes if the canister is exposed to water from an outside leak or otherwise. A monitor response time of about 10 seconds is desirable in view of the rapidly decreasing ability of a faulty canister to scrub $CO_2$, and the swiftness with which a diver looses consciousness in the presence of increasing quantities of $CO_2$. In addition, a $pCO_2$ sensor must be capable of operating at depths of up to 2700 feet in sea water, corresponding to a pressure of about 1200 psia. Additional helpful requirements include adaptability for use in Personnel Transfer Capsules and for extended periods of operation in hyperbaric habitats. By hyperbaric it is meant that the total gaseous pressure is greater than that exerted by the atmosphere at sea level.

One type of sensor for analyzing gas involves a nondispersive infrared (NDIR) technique, an example of which is given in U.S. Pat. No. 3,560,736 to Billetdeaux. The NDIR method is one of the most widely used approaches for detecting trace quantities of a gas, such as $CO_2$, which possess energy absorption bands in the infrared region.

As a brief summary of the NDIR method, the absorption spectrum of infrared radiation by molecular gases consist of a number of absorption bands which correspond to transistions between molecular vibrational levels. In general, the location of the bands is characteristic of each gas and, thus, a particular gas can often be identified by measuring the amount of radiation absorbed in the region of the spectrum where the particular gas has a strong absorption band.

Each absorption band, itself, consists of many separate absorption lines corresponding to transitions between molecular vibrational levels. Instruments utilizing these absorption bands for some purpose can be either dispersive or nondispersive depending on whether or not the absorption is measured at each wavelength. The most common type of infrared gas detector is the NDIR analyzer in which broadband radiation covering part or all of the band is transmitted through a gas sample to an infrared detector, and hence the absorption of radiation by most or all of the discrete absorption lines is measured collectively. When detectors are used which are not inherently specific to the absorption band of a specific gas, an interference filter is generally used to restrict the transmitted radiation to a region centered on the absorption band.

While the location of the center of each absorption line in an absorption band is independent of the temperature, pressure and gas composition, the absorption line shape is highly dependent on these environmental parameters. To monitor $CO_2$ in hyperbaric gaseous environment an analyzer should be relatively insensitive to total pressures ranging from 1 to 80 atmospheres. A simplified treatment of the effect of total pressure on the shape of each absorption line indicates that the line width is proportional to the total pressure, while the absorption at the center of the line is inversely proportional to total pressure. Since the total or integrated absorption of radiation by each absorption line is proportional to the area of the line for thin samples of gas, the fraction of incident radiation removed by the absorption band for a fixed sample path length depends on the partial pressure of $CO_2$ and not on the total pressure. The major constituents of a hyperbaric environment, $O_2$, $N_2$ and He, are not a problem since they do not absorb infrared radiation and are not detectable by an NDIR analyzer. Response of the $CO_2$ analyzer to the other trace constituents of a hyperbaric environment (e.g. $H_2O$, CO or hydrocarbon) can be eliminated by choosing an interference filter which transmits only at the very strong 4.26 $\mu$m $CO_2$ band.

BRIEF SUMMARY OF THE INVENTION

The NDIR method of the present invention consists of subjecting a sample of gas to known density modulation i.e. a controlled change in the number of absorbing gas molecules, and the fractional change in transmitted infrared radiation through the gas is then measured. The radiation is unaffected when no absorbing gas is present so that the instrument reading at these times is zero.

OBJECTS OF THE INVENTION

An object of the invention is to provide a novel method of and apparatus for monitoring the partial pressure of a gas in a hyperbaric environment.

A more specific object of the invention is to monitor the partial pressure of $CO_2$ within a saturation diver's breathing apparatus by using a density modulation technique effective to respond in hyperbaric environments at pressure up to 1200 psia.

BRIEF DESCRIPTION OF THE DRAWINGS

Other objects, advantages and novel features of the present invention will become apparent from the following detailed description of the invention when considered in conjunction with the accompanying drawings, in which FIG. 1 is a schematic diagram of a density modulation analyzer constructed in accordance with the present invention;

FIG. 2 is a graphical representation of the fractional modulation of the transmitted radiation; and FIG. 3 is a schematic diagram of a resistance bridge circuit used to monitor the DC radiation flux.

DETAILED DESCRIPTION

FIG. 1, diagrammatically illustrates the density modulation analyzer 10 of the present invention. An infrared source 12 emits radiation which is transmitted through a cell 14 or chamber containing a fixed sample of gas. The chamber 14 has transparent ends 15 and 17 forming windows which allow the passage of light. The gas is subjected to density modulation by a piston 16 sealed within a small electro-formed nickel bellows 18, the latter having infinite fatigue lifetime under normal operating conditions since the physical displacement required is no greater than 0.5 mm. The piston 16 is driven by drive mechanism 20 which may consist of a crank which, in turn, is driven by a brushless electric motor. The drive mechanism also provides a density modulation frequency reference signal on line 22. An interference filter 24 restricts the radiation reaching an infrared detector and light flux monitoring unit 26 to that of the required absorption band, which for $CO_2$ is at 4.26 $\mu$m. Gas is introduced into the cell through inlet 28 and allowed to exhaust through outlet 30. If the frequency of density modulation is low, i.e. less than 100 Hertz, isolation valves 32 and 34 are required on the gas inlet and outlet ports, 28 and 30 respectively, in order to isolate a fixed volume of gas in the sample cell 14. The valves trap a fix sample of gas and hold the quantity during density modulation. Afterward they are opened to flush the sample with a fresh supply of gas. Piston 16 contacts the cylindrical walls of a side port 36 located at the center of the cell wall opposite the inlet and outlet ports, 28 and 30. Movement of the piston 16 within the side port 36 produces the desired density modulation by compressing and expanding the gas within the chamber 14.

The radiation received at detector and light flux unit 26 is referenced via lines 38 and 39 to amplifier 40. The amplified signal is then conducted through line 42 to synchronous demodulator 44 which compares the detected signal to the reference signal on line 22 from the piston drive 20. The output on line 46 from the synchronous demodulator is the modulated A C component of radiation. This output on line 46 is normalized with respect to the total d c light flux on line 50 from light flux monitor 26 in analog divider 48 resulting in an output on line 54 which is representative of the A C component of radiation with respect to the total d c light flux. The light flux monitor portion of unit 26 measures the total light flux reaching the detector and the operation of combined unit 26 is described more fully in the discussion of FIG. 3. But, the purpose of comparing the total light flux to the modulated signal is to derive an absolute output not affected by signal variations. If simultaneous measurements are made of both the modulated and total components of the transmitted radiation and then ratioed, the density modulation analyzer becomes immune to variations in the light flux, since both the instantaneous total light flux and the modulated component contain the same variation.

The entire system thus far described can be constructed on a minature scale so that the total volume for the optical and mechanical parts is limited to 10 cubic inches.

The apparatus shown in FIG. 1 was designed to monitor gas which is optically thin and a gas sample is defined as being optically thin, if the fractional modulation of the transmitted radiation is proportional to the $pCO_2$. Hence the response will be linear under optically thin conditions. The term "linear" refers to the extent to which the response of the instrument is proportional to the $pCO_2$, with all environmental parameters being held constant. As the concentration of gas is increased, the fractional modulation of transmitted radiation starts to saturate, and departs from linearity. For gas samples which are not too optically thick, however, the response can be made to approximate linearity by using electronic linearization circuits. If direct digital readout of the $pCO_2$ is required, linearization is necessary for gas which is not always optically thin.

The term "environmental parameters" is used to refer to everything that may influence the output of the analyzer with the exception of the $pCO_2$. These parameters include the total pressure, temperature, relative humidity, gas mixture (helium and/or air), electrical supply voltages, and loss in transmission of the optical assembly. It should be noted that, with an appropriate choice of interference filter and source operating termperature, the effect of loss of transmission (caused, for example, by a gradual accumulation of particulates on the infrared windows and sample cell walls) is to reduce the radiated power reaching the detector, and is therefore indistinguishable from a reduction in the source emission (caused, for example, by a decrease in source voltage). Thus, the performance of the analyzer is generally considered as a function of the radiated power reaching the detector without regard to the specific cause of the latter's variation.

When applying the density modulation technique to optically thin sample of gas at normal ambient pressure, the partial pressure $pCO_2$ in the sample gas is given by the expression.

$$pCO_2 = \text{const.} \times \frac{\text{Modulated IR flux}}{\text{total IR flux reaching the detector}} \times \frac{\text{average gas number density}}{\text{Modulated gas number density}} \quad \text{Eq. a}$$

where the gas density referred to is that of the sample gas in the radiation path. If the gas modulation is always performed under the same thermodynamic conditions, Equation $a$ can be expressed in the forms.

$$pCO_2 = K_1 \times \frac{\text{modulated IR flux}}{\text{total IR flux reaching the detector}} \times \frac{\text{total (average) pressure}}{\text{modulated pressure}} \quad \text{Eq. b}$$

$$pCO_2 = K_2 \times \frac{\text{modulated IR flux}}{\text{total IR flux reaching the detector}} \times \frac{\text{total (average) volume}}{\text{modulated volume}} \quad \text{Eq. c}$$

where $K_1$ and $K_2$ are constants.

From Equation $c$ it can be seen that if the ratio of modulated-to-total pressure or volume is held constant (that is, subjecting the gas to a fixed fractional pressure or volume modulation) then the sensitivity to $CO_2$ would be independent of the total pressure and proportional only to the fractional modulation of the transmitted radiation. Furthermore, since the modulated IR signal is proportional to the partial pressure of $CO_2$, there is no modulated light falling on the detector if there is no $CO_2$ present, and the instrument is therefore inherently free of zero drift.

In FIG. 2, the curves indicate that the fractional modulation of the transmitted radiation $S(f)/F$ (and hence, according to Equation $c$, the relative analyzer response) for any given $pCO_2$ value between 0.25 and 8 mm is not strongly affected by pressure. The behavior at pressures below 200 psia is, however, markedly different to that above this pressure. Within the range of $pCO_2$ shown, the analyzer response first rises rapidly from its value at 15 psia and reaches a maximum at about 50 psia, after which the response decreases as the total pressure increases. Over the total pressure range from 200 to 1200 psia, the analyzer response decreases at a slow rate with approximately a constant fractional change in the response with pressure. This feature can be observed from the approximately straight line that may be drawn through the data points for 200 through 1200 psia.

At pressures greatly in excess of 15 psia, $CO_2$ in gas mixtures containing 1 atmosphere air and balance helium, would be expected to produce essentially the same analyzer response as $CO_2$ in helium only. And as can be seen from FIG. 2, this has been verified. However, at pressures closer to 15 psia in which air now constitutes a significant fraction of the gas mixture, the response does differ from that obtained with helium only. Furthermore, the response obtained with $CO_2$ in air is not identical to that of $CO_2$ in helium at the lower pressures. While these differences are not large, they are not unexpected for two reasons. First, the detailed shape of $CO_2$ absorption lines is dependent on the major constituent gases; and secondly, the thermodynamic properties of helium are not identical to air. However, the most significant point is that the nature of the major gas constituents has only a slight effect on the general response characteristics.

Numerical estimates can be made of the maximum error expected of an analyzer whose design is based on the present apparatus. The extreme variation in span accuracy expressed as a fraction of the response at 15 psia, increase monotonically from about 12% at a $pCO_2$ of 0.5 mm to 27% at 8 mm. The term "span accuracy" is used to refer to the difference between measured and actual $pCO_2$ as a function of the total pressure, and helium and/or air composition, with all other environmental parameters, being held constant. This should be a good indication of the maximum possible span inaccuracy at each $pCO_2$ if the analyzer were to be calibrated at one total pressure only, and then used at any pressure between 15 and 1200 psia. However, if the single point span calibration were to be performed at 15 psia, then the maximum deviation from the correct $pCO_2$ increases from about ± 6% at 0.5 mm to + 17% and − 10% at 8 mm.

One possible circuit for detecting radiation and monitoring the total light flux reaching the detector is shown in FIG. 3. A photoconductive PbSe infrared radiation detector 60, encased within a hermetically sealed envelope 61, and its load resistor 62 are considered as one arm of a resistance bridge 64. The PbSe detector 60 is hermetically sealed to prevent water vapor from condensing on the detector or its leads. This stabilizes the temperature of the PbSe chip and enables it to withstand differential pressures of up to 1200 psia. Since the resistance of the PbSe detector 60 is a function of incident radiation, the change in voltage at point 66 in the circuit is approximately proportional to the change in radiation absorbed by the detector 60. The circuit is set up initially such that with the radiation source off, variable resistance 68 is adjusted to make the voltage at point 66 equal to the voltage at point 70 ($V_{66} - V_{70}$). This is accomplished by the addition of a fourth resistor 72 so that $$\frac{R_{60}}{R_{62}} = \frac{R_{72}}{R_{68}}$$

The voltage difference $V_{66} - V_{70}$ then represents the radiation absorbed by the detector, and thus voltage difference provides the input to amplifier 40 via lines 38 and 39. The total d c light flux at the detector 60 is monitored at point 66 and the value is fed via lines 38 and 50 to analog divider 48. With the circuit set up as shown the error in light flux measurement can be held to a maximum of 10% by use of the PbSe detector in one arm of the bridge.

The resistance of the PbSe detector 60 is held constant when the source is off, by thermoelectrically stabilizing the PbSe chip's temperature to a fixed value. Furthermore, due to the bridge configuration, $V_{66} - V_{70}$ is maintained at zero when the source is off, if the bias voltage $V_{cc}$ should vary. Hence, a stable zero reference exists for monitoring the source power reaching the detector.

However, it should be noted, that variations in $V_{cc}$ do result in a variation of the responsivity of the detector (where responsivity is defined as the change in voltage $V_{66}$ per watt change of power reaching the detector). Since an interference filter restricts the radiation reaching the detector to that straddling the strong 4.26$\mu$m band of $CO_2$, any variation in responsivity will produce the same fractional change in both the AC pressure modulated component and the DC (or total light flux) component of the radiation. Hence the fractional modulation of the detected radiation will be independent of detector responsivity (and hence $V_{cc}$).

The level of DC flux reaching the detector is of the order of a few milliwatts. If the voltage $V_{cc}$ applied across the detector and load resistors is 30 volts, then the voltage responsivity will be of the order of 500 volts per watt. Hence the change in voltage at the detector on exposure to the light flux would be of the order of 1 volt. The differential measurement of 1 volt out of 30 volts to an accuracy of a few percent using the bridge circuit presents no problems, provided the temperature coefficients of the bridge resistances are sufficiently small. Calculations indicate that the accuracy required is practical, though should humidity temperature requirement prove troublesome, the bridge resistors and monolithic differential amplifier 40 can be temperature stabilized within the hermetically sealed detector package. Thus, there is adequate voltage sensitivity.

By changing the thermistor temperature by a known amount, the temperature coefficient of the dark resistance of the PbSe chip has been found to vary 0.5% per degree C at the chip temperature used in this evaluation of 7° C. The percentage change in chip resistance per unit of power reaching the detector has been measured to be 10% milliwatt. Hence the same change in chip resistance is produced by either a 20°C increase in temperature or exposure of the chip to 1 milliwatt of radiation at 4.2μm. Therefore, the chip temperature would have the change by 0.2°C to produce the same response as a change of 0.01 milliwatt in detected power. This technique maintains the chip temperature constant to closer than 0.2°C over a wide variation in environmental parameters, and the behavior of this particular detector package has been consistent with this.

Since only 2% of the radiation emitted by a 120°F surface is within the spectral response region of PbSe at 7°C (namely, wavelengths less than 5.0ym) the changes in the background temperature would not produce a significant response in this application. The PbSe detector package has been placed in an environmental chamber and temperature cycled between 50°F and 110°F. The change in the detector voltage over this range corresponds to approximately 1% of the DC light flux anticipated in an actual analyzer, and hence the bridge circuit approach to measuring the DC flus is not sensitive to wide variations in the temperature, of the detector housing.

Within one minute of cooling PbSe from ambient to its thermally stabilized temperature, the chip resistance takes up a value from which it monotonically increases over the time period of a few hours, and asymptotically approaches a resistance which is about 1% greater than its value one minute after the initial cool down. The actual time to reach one half of this 1% change in resistance is about one hour. Since this change in resistance corresponds to a 0.1 milliwatt change in the DC flux reaching the detector, then for light levels about 1 milliwatt, it constitutes a maximum of 10% variation in the span stability. For increased DC light levels, this error would be proportionally less.

An additional characteristic of the bridge circuit approach to monitoring the DC light flux has been variously referred to as the "light strike" or "flash" effect. This manifests itself as a monotonic change in the dark resistance of the PbSe chip on exposure to radiation. Thus, using the bridge circuit, this would result in an uncompensated change in the null condition originally set up in the initial adjustment before exposure to radiation. In practice, this change in dark resistance while PbSe is exposed to radiation has been studied by intermittently blocking the light beam for a few seconds.

The time taken for the dark resistance to change by one half of the total change is approximately 20 minutes. The magnitude of the "flash" effect at the flux levels encountered in this application is approximately 10% of the total response to the radiation, irrespective of the actual flux level. Thus while the "flash" effect constitutes a significant span instability, the maximum error is always a constant fraction of the span. By comparison, the maximum of 10% error in span due to the long term chip resistance stabilization (discussed in the previous paragraph) may be reduced by increasing the flux level. It should be further noted that these two effects have opposite sign and therefore tend to cancel. The cause of the "flash" effect is not understood by the manufacturers of PbSe, but that it is not related to any heating effect resulting from the radiation absorbed has been demonstrated during this investigation by the observation that the chip resistance does not change when a few milliwatts of power between 5.5 and 6.5ym (at which wavelengths the responsivity of PbSe is essentially zero) are absorbed by the PbSe.

It should be noted that after the chip has been exposed to radiation at its stabilized temperature for a few hours, any further change occurs over a very long time scale, so that readjustment of the flux bridge in a habitat $pCO_2$ monitor, for example, need only be made daily to reduce this source of span instability to a few percent.

In summary, the validity of the flux bridge approach to monitoring the level of DC light flux depends then on the accuracy required. If a span instability of 10% is acceptable, as it may well be for the application of a $pCO_2$ monitor in a saturation diver's breathing apparatus, then the flux bridge approach is valid.

Thus there has been described as effective method and apparatus for detecting $CO_2$ in a hyperbaric gaseous environment. Obviously, many modifications and variations of the present invention are possible in light of the above teachings. It is therefore to be understood that, within the scope of the appended claims, the invention may be practiced otherwise than as specifically described.

What is claimed is:

1. A method of detecting $CO_2$ in a hyperbaric gaseous environment, comprising the following steps:
   trapping a fixed amount of gas within a chamber set within a variable high-pressure environment;
   projecting infrared radiation through the chamber;
   subjecting the trapped gas to density modulation, a) obtaining a modulation signal respresentative of the frequency of said density modulation;
   detecting the radiation siganl passing through said gas;
   comparing said detected radiation signal to said modulation signal to produce a modulated ac component of radiation determinative of the gas concentration of $CO_2$.

2. Apparatus for detecting the concentration of a specific gas, which is capable of absorbing infared energy, in a hyperbaric gaseous environment, comprising:
   a chamber for holding a fixed sample from said gaseous environment;
   an infrared source for projecting radiation through said sample;
   density modulation means for modulating the density of said sample in a precisely controlled manner and producing a modulation signal representative of said modulation;
   detector means for measuring the radiation passing through said sample, said detector means including a Pb Se chip housed within a hermetrically sealed envelope, the resistance of said Pb Se chip varying in accordance with the detected radiation; and
   comparison means for comparing the measured radiation to said modulation signal to obtain a modulated a.c. signal representative of the fractional change in the radiation at said detector means which is indicative of the concentration of the $CO_2$ gas.

3. The apparatus of claim 2 wherein said density modulation means comprises a piston driven by a motor operated crank, the frequency of movement of said piston being referenced to said comparison means.

4. The apparatus of claim 2 wherein said detector means further includes an interference filter positioned between said detector and said chamber to restrict the radiation received at said detector to specific wavelengths corresponding to the absorption region of said specific gas.

5. The apparatus of claim 2 wherein said detector further includes a resistance bridge, said PbSe chip forming one arm of said bridge so that variation is resistance of said chip appears as a fractional change in voltage across said bridge.

* * * * *